United States Patent [19]

Eisenstein et al.

[11] Patent Number: 4,885,714

[45] Date of Patent: Dec. 5, 1989

[54] CALCULATOR HAVING A USER-ACCESSIBLE OBJECT STACK FOR THE UNIFORM APPLICATION OF MATHEMATICAL FUNCTIONS AND LOGICAL OPERATIONS TO A MULTIPLICITY OF OBJECT TYPES

[75] Inventors: Gabe L. Eisenstein, Corvallis; Laurence W. Grodd, Portland; Paul J. McClellan; Robert M. Miller, both of Corvallis; Charles M. Patton, Eugene; William C. Wickes, Corvallis, all of Oreg.

[73] Assignee: Hewlett-Packard Company, Palo Alto, Calif.

[21] Appl. No.: 923,933

[22] Filed: Oct. 27, 1986

[51] Int. Cl.[4] .............................................. G06F 15/00
[52] U.S. Cl. ............................................... 364/709.01
[58] Field of Search ..... 364/709, 736, 200 MS FILE, 364/900 MS FILE, 710, 706

[56] References Cited

U.S. PATENT DOCUMENTS

| | | | |
|---|---|---|---|
| 3,889,243 | 6/1975 | Drimak | 364/200 |
| 4,348,733 | 9/1982 | Harrison | 364/709 |
| 4,456,964 | 6/1984 | Olander, Jr. et al. | 364/710 |
| 4,587,632 | 5/1986 | Ditzel | 364/736 |

*Primary Examiner*—Gary V. Harkcom
*Assistant Examiner*—Long T. Nguyen

[57] ABSTRACT

A calculator is defined by a user-interface centered around a last in first out stack of mathematical or logical objects, that is both visible and accessible to a user. Objects may be any of a number of different types, each type characterized by specific logical or mathematical rules. Calculator operations are provided that may be applied in a uniform manner to the objects, affecting either or both the internal composition of the objects or the external positions and number of the objects on the stack. Objects of different types are distinguished upon entry on the stack and in visible display by characteristic prefix and postfix symbols, and can be entered from a keyboard or created dynamically as the result of calculator operations.

7 Claims, 13 Drawing Sheets

| TYPE | SYMBOL | EXAMPLE |
|---|---|---|
| REAL NUMBER | | 1.23456E-25 |
| COMPLEX NUMBER | ( ) | (123.45 678.90) |
| BINARY NUMBER | # | #123AB |
| STRING | ".." | "RESULT" |
| VECTOR | [ ] | [1.23 4.56 7.89] |
| MATRIX | [[ ]] | [[6.45 3.21]] |
| LIST | { } | {1.23 "ABC" #45} |
| NAME | '..' | 'CALC' |
| PROGRAM | << >> | <<DUP 5+SWAP>> |
| ALGEBRAIC | '..' | 'X+2*Y=Z' |

OBJECTS AND SYMBOLS

| ARRAY | BINARY | COMPLEX | STRING | LIST. | REAL |
|---|---|---|---|---|---|
| A | B | C | D | E | F |

| STACK | STORE | | ALGEBRA | | PRINT |
|---|---|---|---|---|---|
| G | H | I | J | K | L |

PROGRAM

| CONTROL | BRANCH | TEST | | CATALOG | UNITS |
|---|---|---|---|---|---|
| M | N | O | P | Q | R |

| ≤ | ≥ | ⇒ | Σ | ° | u |
|---|---|---|---|---|---|
| S | T | U | V | W | X |

| < | > | \|\| | } | ] | ) |
|---|---|---|---|---|---|
| Y | Z | # | { | [ | ( |

| NEWLINE | ≫ | ≠ | ? | ∝LOCK |
|---|---|---|---|---|
| SPACE | << | = | LC | ∝ |

FIG 1A

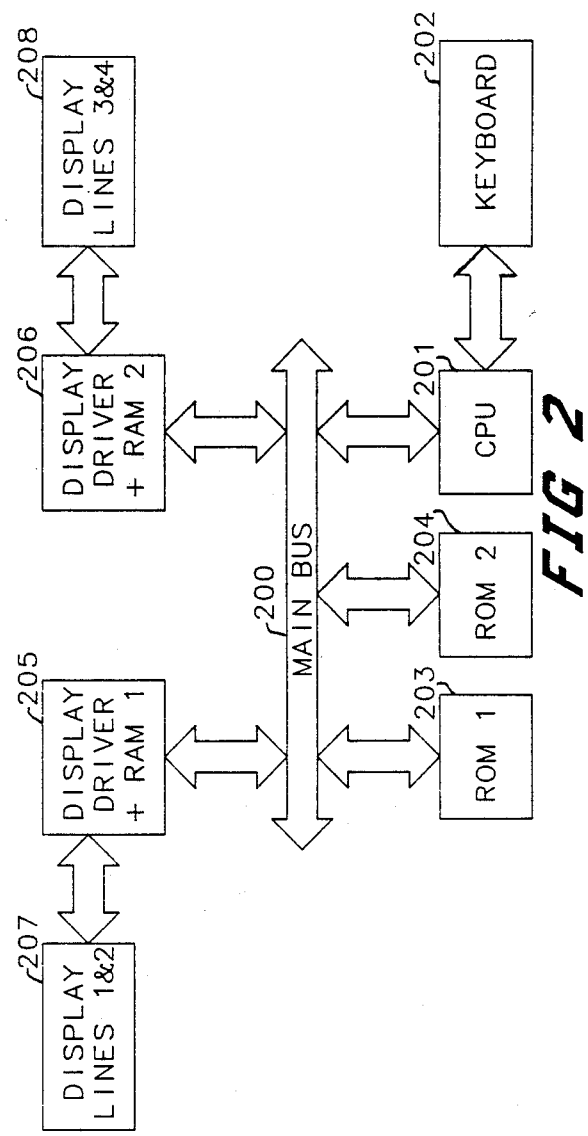

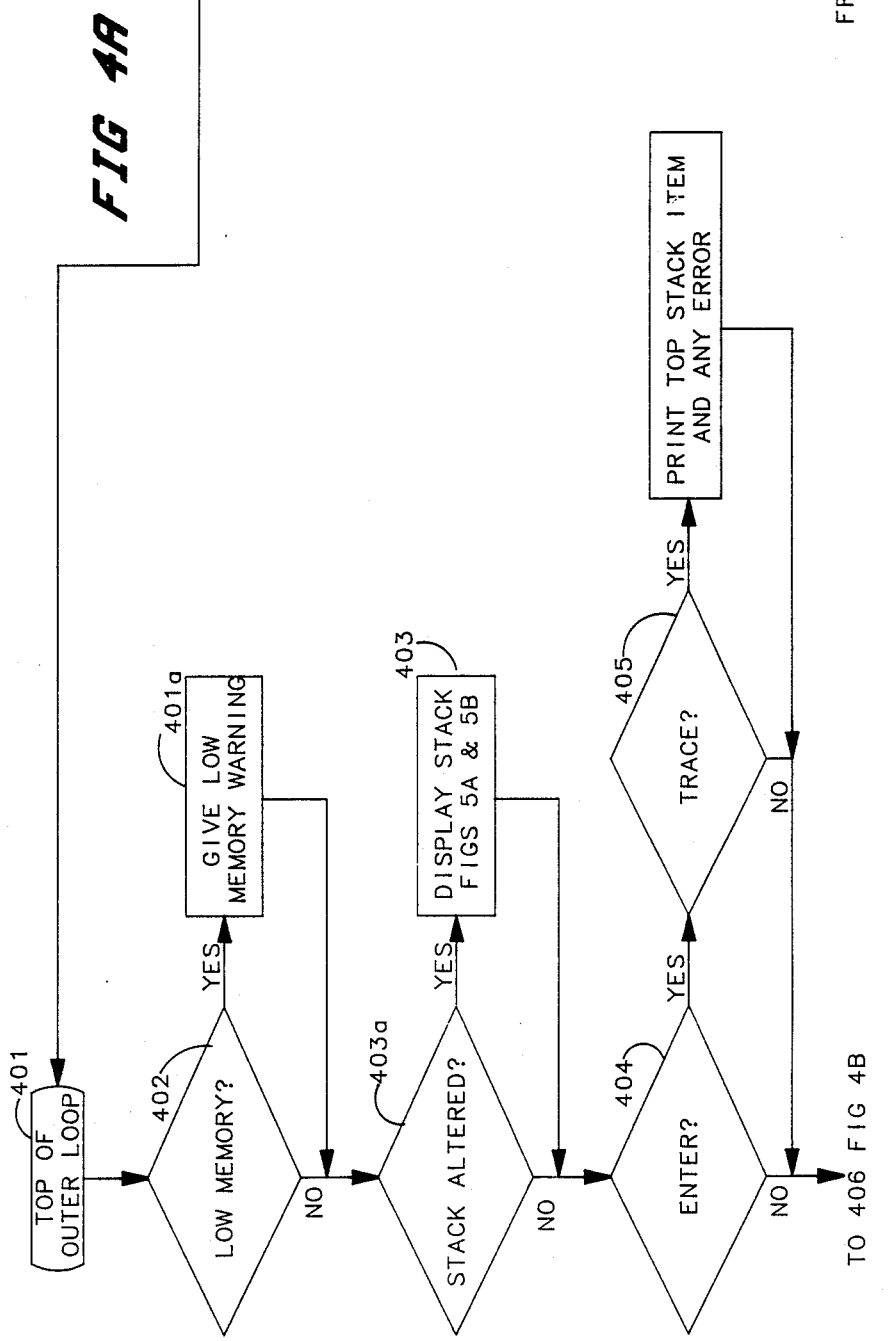

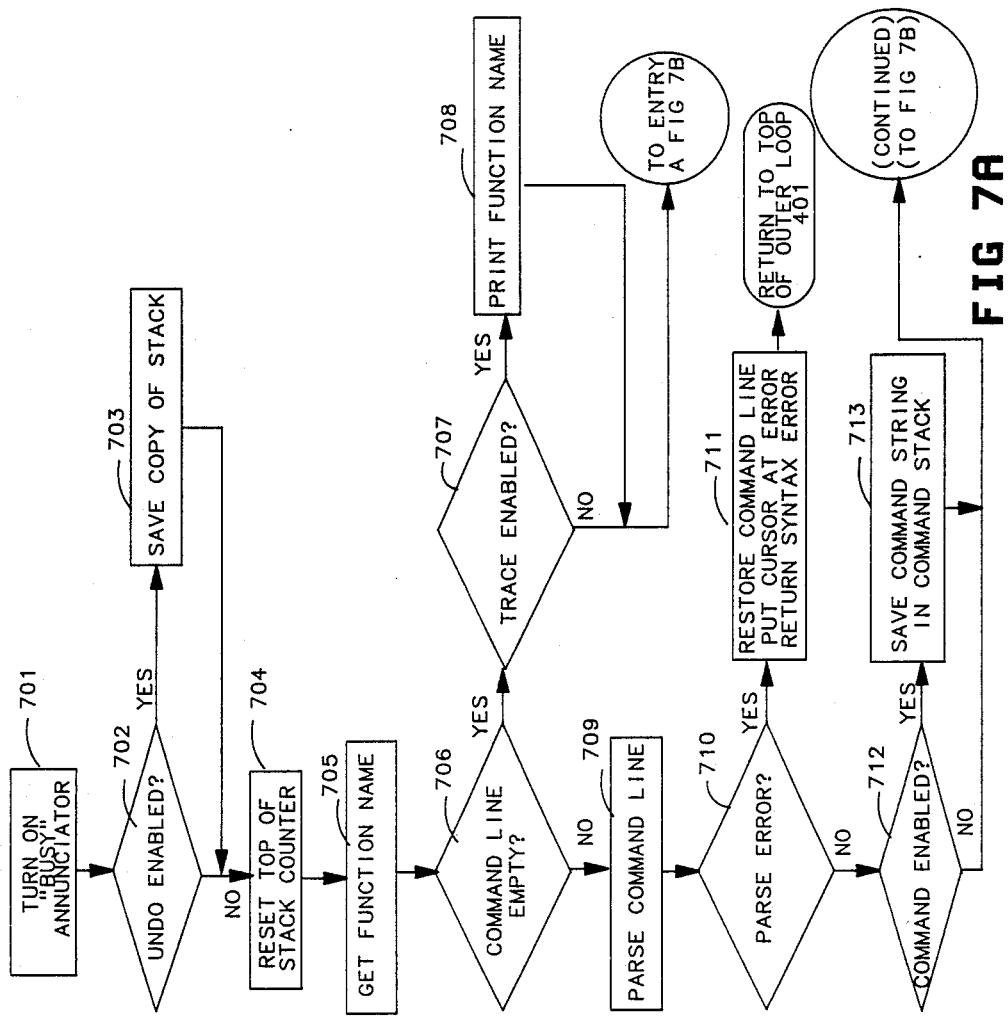

CALCULATOR HAVING A USER-ACCESSIBLE OBJECT STACK FOR THE UNIFORM APPLICATION OF MATHEMATICAL FUNCTIONS AND LOGICAL OPERATIONS TO A MULTIPLICITY OF OBJECT TYPES

TECHNICAL FIELD

This invention relates generally to calculators and more particularly to symbolic algebra calculators having user interfaces providing for user manipulation of mathematical expressions.

BACKGROUND ART

A calculator generally comprises a packaged combination of a central processing unit, a read-only memory containing the calculator's built-in instruction set, a random access memory to hold user data and programs, a keyboard for user control of the calculator, and a display to show results to the user. The keyboard contains character keys, for entering data and/or instructions, and immediate-execute keys that permit single keystroke execution of operations.

Calculators differ in their user-interface, i.e., the manner in which the calculator interprets keystrokes and saves or displays results. Of particular interest is the methods by which calculators deal with the evaluation of mathematical expressions. Prior art calculators use variations of three different approaches:

In Reverse Polish Notation calculators, arguments are entered into a fixed-size last in first out stack, and mathematical functions are applied to the topmost arguments. The function value is returned to the top of the stack, where it can then be used as the argument for a subsequent function. This method has the advantages of keystroke efficiency, intermediate results, explicit operator precedence, and uniformity. It has the disadvantage that the order of entry of arguments and operators corresponds to so called Reverse Polish Notation, rather than the more conventional notation of written mathematical expressions.

In direct formula entry calculators, a mathematical expression is entered as a replica of the written form of the expression, then evaluated all at once when the entire expression has been entered. Its primary advantage is the similarity between the written expression and the calculator input. The disadvantages are the inflexibility of the format, the lack of intermediate results of subexpressions, and the lack of a straightforward method of referring to the results of previous evaluations.

So-called algebraic logic calculators intermix the postfix (arguments entered before functions) and infix (functions of two arguments entered between their arguments) syntax of the preceding two methods. Arithmetic functions such as +, −, *, and / are entered between their arguments, to preserve the correspondence with written notation. Functions of one argument are entered after their arguments to permit the display of intermediate results immediately upon the function keystroke. The advantages are similarity with written notation for arithmetic operations and display of intermediate results during expression evaluation. Except for the latter, the disadvantages are the same as for the direct formula entry case.

All prior art calculators, regardless of their general user interface share the common limitation that they are optimized for dealing only with real-valued floating-point numbers within the context of their ordinary mathematical expression evaluation. Furthermore, none have the capability of applying mathematical functions to formal variables or unevaluated expressions.

DISCLOSURE OF THE INVENTION

The present invention consists of a calculator with the following user interface:

1. Individual mathematical or logical entities called objects are entered, displayed, and manipulated on a last in first out stack of indefinite size. The contents of this stack are visible to the user, and it constitutes the focus of the calculator user interface.

2. Objects may be several different types, but all are manipulated uniformly on the stack. Object types are distinguished by mathematical or logical rules that determine their internal structures and values. Object types may include, but are not restricted to the following examples:
   1. Real-valued numbers.
   2. Complex-valued numbers.
   3. Real- or complex-valued vectors.
   4. Real- or complex-valued matrices.
   5. Text character strings.
   6. Lists of objects.
   7. Identifiers (names).
   8. Procedure objects, containing sequences of objects for evaluation.

Objects may be simple or composite. Composite objects comprise a body of two or more objects or object pointers.

3. Objects are entered by the user and displayed on the calculator in a form that corresponds to their ordinary mathematical or logical structure and values. Different object types are further identified at entry and displayed by characteristic prefix and postfix symbols. At entry, the object symbol identifies the object type independent of any further keystrokes, so that the actual structure or value of the object can be checked by the calculator against object type-specific syntax rules. The term logical, as used herein, is meant to cover objects of forms such as those defining mathematical, physical, economic, or other relationships.

4. Calculator keys may change their operation according to a current entry mode. In immediate-execute mode, keys execute their definitions as they are pressed. In deferred-execute mode, or alpha entry mode, pressed keys just echo their "names" as alphanumeric strings, for later execution. The mode can be set automatically by the calculator according to the nature of the current entry, or can be controlled manually.

5. Built-in operations, stored in read only memory, which are or can be bound to a key, take objects as arguments from the stack, and return their results to the stack. These operations may deal with the objects as whole entities, or may deal with the internal structures or values of the objects. Where a single mathematical or logical operation can be sensibly applied to different object types, or combinations of object types, all versions of the operation are combined under a single operation name. The operation itself must inspect the available object arguments and branch to the appropriate sub-operation.

6. A special class of algebraic procedure objects is provided, in which the contained objects are organized to represent a mathematical expression, and are entered and displayed according to ordinary mathematical syntax. Correspondingly, built-in procedure objects are provided that represent mathematical functions; when applied to one or more algebraic objects as arguments, the functions return new algebraic objects containing the applied function objects in the appropriate positions in the result expression.

BRIEF DESCRIPTION OF THE DRAWINGS

FIGS. 1A and 1B show the keyboard and display of a calculating device in accordance with a preferred embodiment of the present invention.

FIG. 2 shows the internal chip-level architecture of the calculating device shown in FIG. 1.

FIGS. 4A and 4B depict a flowchart representing the logical implementation of the user interface of the calculator.

FIGS. 5A and 5B, 6, 7A, and 7B are flow chart expansions of key portions of FIGS. 4A and 4B.

BEST MODES FOR CARRYING OUT THE INVENTION

The Calculator

Figure 1B:
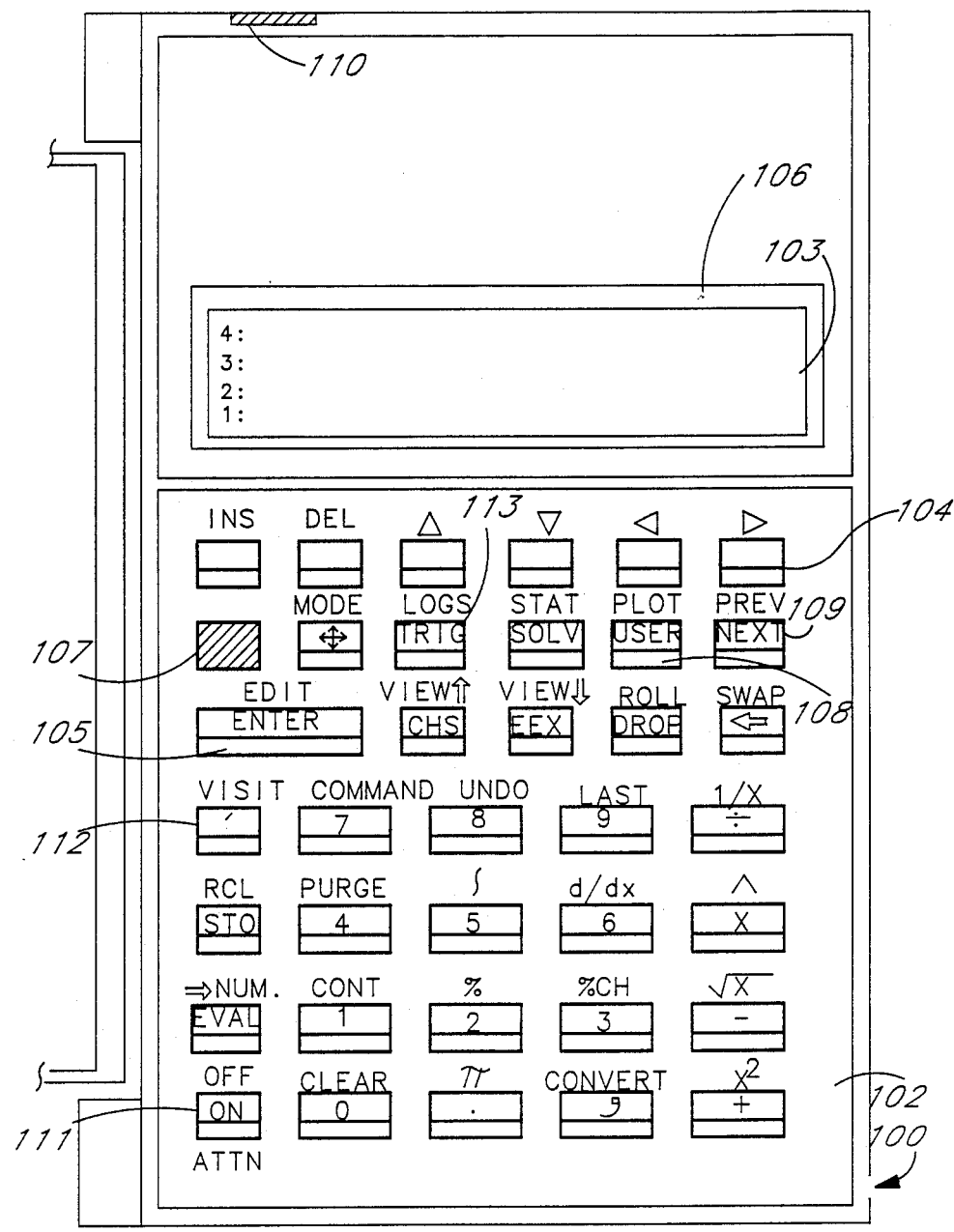

In FIGS. 1A and 1B, a calculating device 100 is shown having a first section 101, FIG. 1A, and a second section 102, FIG. 1B. First section 101 includes a plurality of keys, which include keys for entering alphanumeric symbols.

Second section 102 includes a display 103. In the preferred embodiment, display 103 is a liquid crystal, dot array display which displays four lines of twenty-three characters each. Display 103 also includes a top line 106 of annunciators, (not shown), which are used individually to indicate various calculator modes of object execution and/or operation.

Second section 102 also includes a plurality of keys, including number keys and function keys as labeled. An ENTER key 105 is used to terminate alphanumeric character entry and to begin processing of the entry (see FIGS. 7A and 7B). A shift key 107 acts to cause the next key pressed to execute its alternate definition, as labeled above that key.

Second section 102 also includes a row of six multi-function keys 104, which may have associated with them a function or the value of a variable. The current definition of a multifunction key is indicated by a menu label displayed directly above these keys, in the bottom-most character row of the display 103, see FIG. 3D, for example.

Figure 3:
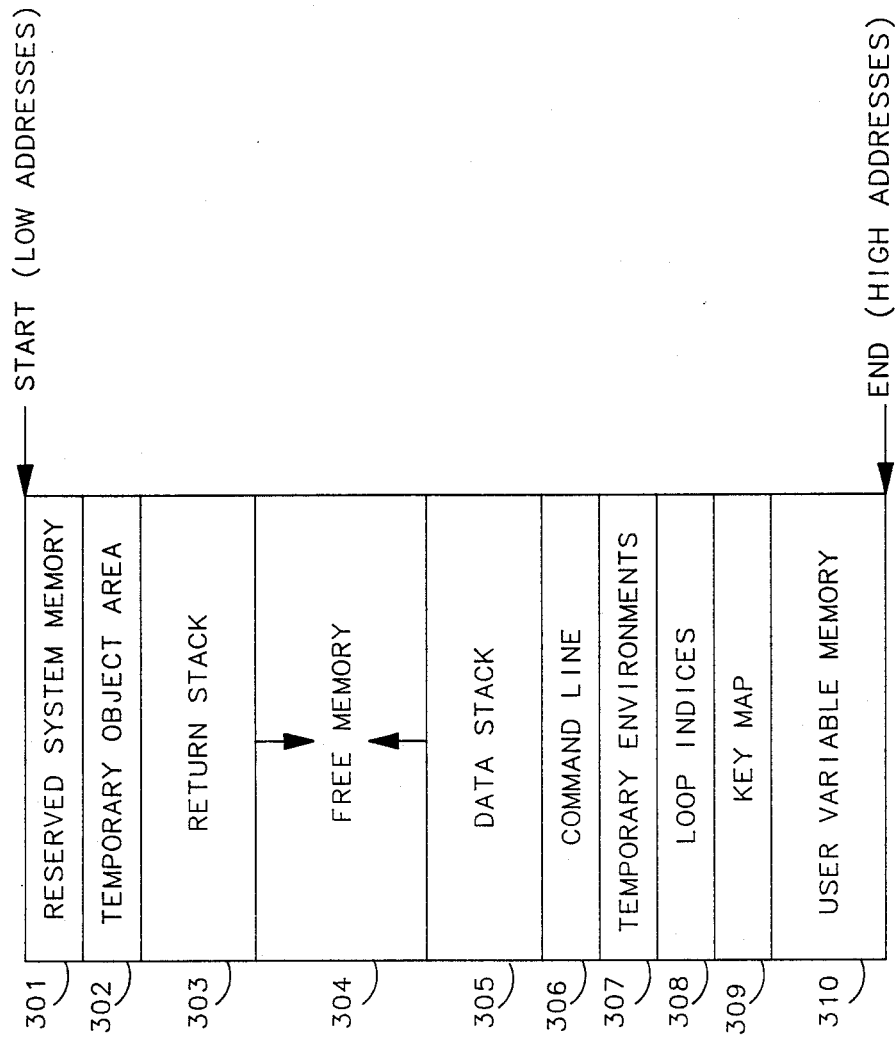
FIG. 3 shows the random access memory configuration of the calculating device shown in FIG. 1.
Figure 3A:
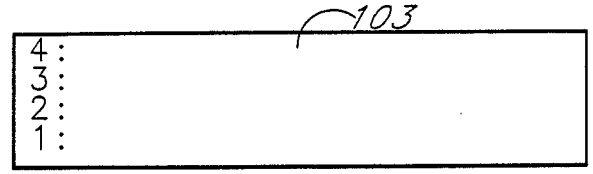
FIGS. 3A-3I illustrate the display seen by the user in the step by step, entering, manipulation and evaluation of an expression.
Figure 3B:
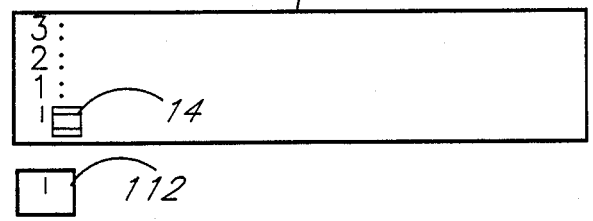
Figure 3C:
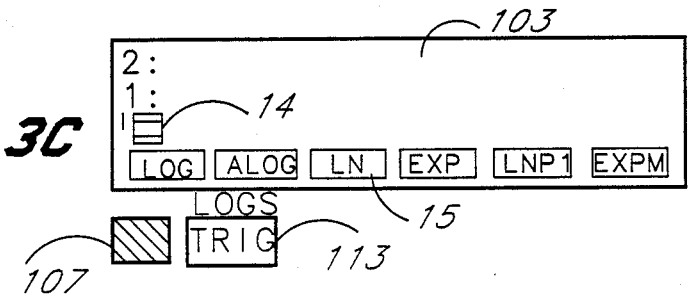
Figure 3D:
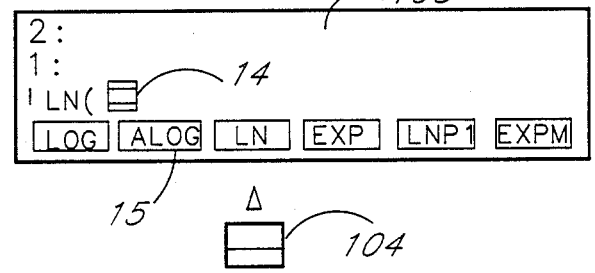
Figure 3H:
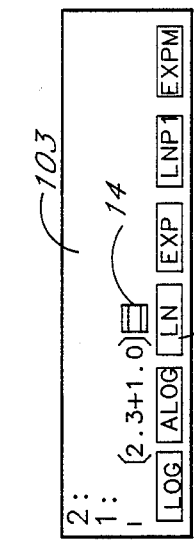

First and second sections 101 and 102 contain various keys that assign groups (menus) of associated calculator functions, in menu subgroups of 6 to the multi-function keys 104, as seen in FIG. 3D. A menu label for each calculator function is displayed above each key 104. Included is a USER menu key 108, that assigns user variables automatically to the multifunction keys 104. A NEXT key 109 causes the multifunction key assignments to advance to the next group of six functions in the current menu. The shifted function, PREV, of this key 109 reactivates the previous six functions.

Second section 102 also contains an infrared light-emitting diode 110, which is used for transmitting data to a corresponding receiver, typically a printing device.

The ON key 11 is a special interrupt key that allows the user to turn the calculator on or off, and to interrupt normal calculator operation when the calculator is on.

In the Disclosure of the Invention, individual mathematical or logical entities referred to as objects are said to be displayed and manipulated on a last in first out stack of indefinite size. Calculator operation centers around the evaluation of objects on the stack. An object can be data, a name, or a procedure. Data objects do nothing special (they are just data), name objects refer to other objects and procedure objects process the objects and commands in their definitions. The fundamentals of this calculating operating system are described in Patent Application Ser. No. 868,978, filed May 30, 1986, for a Data Processing System And Method For The Direct And Indirect Execution of Uniformly Structured Objects Types, and assigned to the assignee of this invention.

In the referenced system, uniformly structured objects are indifferently mixed in object memory with object pointers. The objects address prologues of object execution sequences in memory. The object pointers address other objects. The objects are properly evaluated whether directly or indirectly addressed. A pointer selectively points to or addresses objects or object pointers.

When an object is directly addressed by the pointer, the addressee of the object's addressee in memory is addressed which initiates the object execution sequence.

When an object is indirectly addressed, the pointer addresses an object pointer. The object pointer addresses an object. The object's addressee in memory is addressed which initiates the object execution process.

More particularly, the object execution process employed in this invention, provides for correct and automatic evaluation of both objects and object pointers which are indifferently included in the execution sequence. The objects are provided with a uniform structure so that all objects can be indifferently executed, either directly or indirectly. Objects of different types are still uniformly structured. Each comprises at least a prologue address and a body. These two parts are contiguous in memory. The prologue address addresses a prologue in memory which describes execution of the object. The body is data. An object is pointed to, or addressed, if its prologue address part is pointed to or addressed.

The object may be a single object or a composite object. If its body is a sequence of objects and/or object pointers, it is a composite object.

In the direct execution of an object, a pointer, called an interpreter pointer, points to the prologue address of an object. This prologue address addresses a prologue of object execution in memory which directly identifies an object to execute. In indirect execution of an object the interpreter pointer points to an object pointer which in turn points to or addresses the prologue address of an object which is the object to execute. Since the object pointer does not address a prologue in memory, there is no direct identification of an object to execute. The prologue address addresses a prologue of object execution in memory.

Thus in providing uniformity of structure among the objects, in which each comprises a prologue address and a body, in the provision of prologues of object execution in memory and in the use of object pointers and interpreter pointers in which interpreter pointers and object pointers may selectively identify objects by pointing to their prologue address parts and, additionally, in which an interpreter pointer may point to an object pointer, a simple technique is provided, permitting intermixing of objects and object pointers for direct or indirect object execution with a minimum of processing steps. This reduces programming and conserves memory which significantly reduces processing overhead.

Definitions

Data Objects

These objects represent data treated as logical units: numerical data, character strings, and lists of objects.

| Data Objects | | |
|---|---|---|
| Type | Object | Description |
| Real number | Real number | Real-valued decimal floating-point number. |
| Complex number | Complex number | Complex-valued decimal floating-point number. |
| Binary integer | Binary integer | 64-bit binary integer number. |
| String | String | Character string. |
| Real array | Real vector Real matrix | n-element real vector. nxm-element real matrix. |
| Complex array | Complex vector Complex matrix | n-element complex vector. nxm-element complex matrix. |
| List | List | List of objects. |

Name Objects

These objects name other objects stored in user memory. Local names can be created by procedures and are automatically deleted when the procedure has completed evaluation.

| Name Objects | | |
|---|---|---|
| Type | Object | Description |
| Name | Name | Refers to an object stored in user memory. |
| | Local name | Refers to an object temporarily held in local memory. |

Variables

A variable is a combination of an arbitrary object and a name that are stored together. The name becomes the name of the variable; the other object is the value or contents of the variable. They are stored together in user memory, which is separate from the stack. Variables replace the numbered data registers and program memory found on most calculators.

Procedure Objects

These objects contain procedures-sequences of objects and commands that are processed when the procedure object is evaluated. A program object can contain any sequence of objects and commands, including those affecting the stack, user memory, or calculator modes. An algebraic object contains a limited number of object types and commands, and its syntax is similar to mathematical expressions and equations.

| Procedure Objects | | |
|---|---|---|
| Type | Object | Description |
| Program | Program | Contains any sequence of objects. |
| Algebraic | Expression | Contains a mathematical expression. |
| | Equation | Contains a mathematical equation relating two expressions. |

Programs

A program is essentially the object form of a command line. The objects and commands entered in the command line constitute a procedure. When that procedure is surrounded by the program delimiters, this indicates that the procedure is to be treated as an object that will be evaluated later.

Expressions

An expression is a procedure representing a mathematical expression that is entered and displayed in a syntax corresponding to ordinary mathematical forms. Evaluating an expression puts each object on the stack and evaluates it.

Equations

Equations are two expressions related by an equal "=" sign. Evaluating an equation produces a new equation. The new left-hand expression is the result of evaluating the original left-hand expression. The new right-hand expression is the result of evaluating the original right-hand expressions.

Commands

Commands are built-in procedures that can be included in programs. A command name as it appears in the command line (for example, DROP or SIN) can be considered to be the unquoted name of a procedure object stored in the calculator.

The Stack

The stack is a sequence of numbered levels, each holding one object. Objects enter the stack in level 1, lifting objects already in the stack to higher levels. Objects also leave the stack from level 1, dropping the objects remaining on the stack to lower levels. All objects are treated identically—simply as objects—on the stack.

Commands are provided to duplicate, delete, and reorder objects on the stack. Several of these commands are found on the key board (DROP, SWAP, ROLL, and CLEAR); others are in the STACK menu.

Most commands take input objects (called arguments) from the stack and after execution return output objects (called results) to the stack. The arguments must be present on the stack before the command is executed. The command removes its arguments and replaces them with its results. For example, the function SIN takes a value (a real or complex number, or an algebraic) from level 1, computes its sine, and returns the result to level 1. The function + takes two values from the stack and returns their sum to the stack.

This type of logic, where the command comes after the arguments, is called postfix logic or RPN, for Reverse Polish Notation.

Annunciators

The annunciators which appear at the top of the display, (line 106) indicate the angle mode, the entry mode, and other status information.

| Annunciator | Annunciators Indication |
|---|---|
| ○ | A program is suspended. |
| ⤴ | The shift key has been pressed. |
| α | Alpha entry mode is active. |
| ((•)) | The calculator is busy-that is, not ready for keyboard input |
| ⌧ | Low battery |
| 2π | The current angle mode is radians. |
| ✎ | The calculator is sending output to the printer. |

Object Entry

When a key is pressed to begin entering new objects, the character on the key is entered into a command line. The command line can contain any number of objects, represented in text form. It appears at the bottom of the display (immediately above the menu labels, if present). The command line also appears when EDIT, or VISIT is used to view or alter the contents of an existing object.

The contents of the command line are processed when ENTER is pressed (or any command or function key that automatically performs ENTER). The contents of the command line are evauated as a program, and the command line disappears from the display.

Any number of characters can be entered into the command line. The line can be broken into several rows by pressing NEWLINE, which inserts a "newline" character (line-feed) into the command line string at the current cursor position. Newline characters act as object separators, but are otherwise ignored when the command line is evaluated.

If more than 23 characters are entered into the command line, characters scroll off the display to the left. An ellipsis ( . . . ) appears in the leftmost character position to indicate the undisplayed characters. If an attemmpt is made to move the cursor past the left end of the display, the leftmost characters scroll back into the display, and characters scroll off the display to the right. An ellipsis then appears at the right end of the display. When the command line contains multiple rows of text, all rows scroll left and right together.

FIG. 2 shows the internal chip-level architecture of calculating device 100. A central processing unit 201, two read-only memories 203 and 204, and two combination display driver and random-access memories 205 and 206, are shown coupled to a main bus 204. Each display driver controls two character lines of the liquid crystal display 103, (207 and 208). A keyboard 202 is shown coupled to the central processing unit 201. Keyboard 202 may include two sections of keys 101 and 102, FIG. 1, but may also represent alternate forms of entry of data such as a touch-sensitive screen. The specific organization and utilization of this system and its elements in accordance with this invention will be apparent as this description develops.

FIG. 3 is a map of the utilization of the random access memories 205 and 206 by the operating system contained in the read only memories 203 and 204, to support the user interface of this invention. The term object used here and in the referenced patent application, as noted above, represents any of the multiplicity of data types supported by the operating system, including mathematical data and expressions, programs, etc. Objects may exist in the read only memories 203 and 204, and in the random access memories in the temporary object area 302, or the user variable area or memory 310. FIG. 1A, in the top panel, lists object types, their symbols, and examples of objects types.

A reserve system memory 301 contains memory addresses that identify the remaining memory regions 302–310, plus other permanently allocated system data.

A temporary object area 302 contains nameless objects, created during calculator use.

A return stack memory area 303 is a last in first out stack of addresses that constitute pointers to object sequences representing pending calculator operations. This stack grows towards the end (higher addresses) of memory.

A free memory area 304 is the region of memory currently unused.

A data pointer stack memory area 305 is a last in first out stack of addresses that constitute pointers to objects. The user interface of the present invention displays a human-readable form of the objects pointed to by the stack pointers, rather than the pointers themselves. The data pointer stack memory 305 grows into free memory towards the start (lower addresses) of memory.

A command line memory area 306 is a dynamically allocated user memory used to accumulate user-entered commands and data in the form of text characters.

A temporary environment memory area 307 is a dynamically allocated linked-list of objects used primarily for storage of intermediate results and parameter passage.

A loop indices memory area 308 is used to save start and stop indices for looping program constructs.

A key map memory area 309 defines the current functions associated with each keyboard key.

A user variable memory area 310 contains named objects (variables) created explicitly by the user.

The accessing and function of the memories and the display of the calculator, as well as the specific function of the system of FIG. 2, is demonstrated in the entry, manipulation and evaluation of the expression LN (2.3+1.0) which follows. Reference is made to FIGS. 3A through 3I.

1. Press [ON] key 111. The display is as seen in FIG. 3A. The four lines of the display are numbered on the left of the screen in descending order from top to bottom. This is an immediate entry mode.

2. Press the delimiter key ['] key 112. This delimiter symbol ['] symbolizes objects (names and algebraics). The display is as seen in FIG. 3B. In the immediate entry mode (as seen in FIG. 3A), this initiates or activates the algebraic entry mode. The algebraic cursor 14, in FIG. 3B is in the lower left corner (original line 1) of the display screen beside the delimiter symbol [']. In this mode, pressing a key corresponding to an operation not permissible in an algebraic expression executes the operation corresponding to the key. Pressing an algebraic function key adds the function name to the command line. If the function LN takes its arguments in parentheses, such as LN (2.3+1.0), the opening parentheses is also added. Lines 1 to 4 are shifted up leaving numbered lines 1, 2 and 3 visible.

Figure 3I:
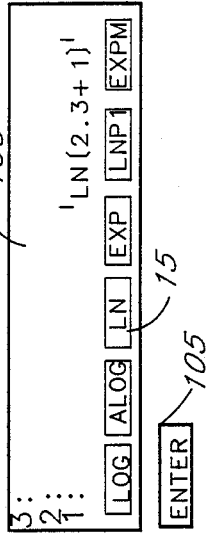
Figure 3E:
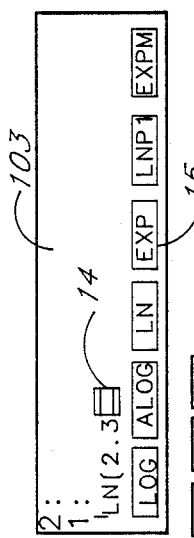
Figure 3F:
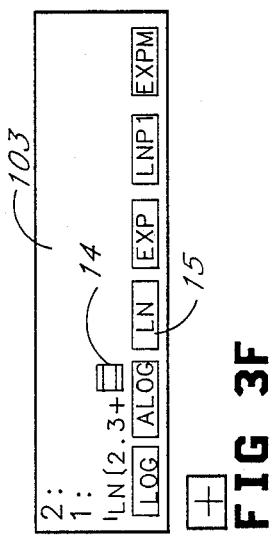
Figure 3G:
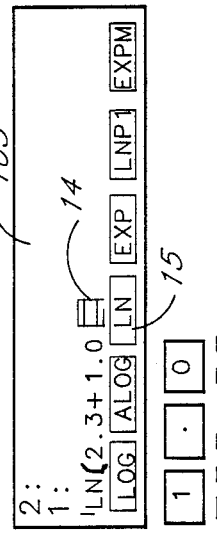

3. Press the shift key 107 and the shifted LOGS key 113. The display is as seen in FIG. 3C. The individual menu labels 15 are displayed in line 1. The algebraic cursor 14 is lifted to line 2 and lines 1 to 4 are shifted up, leaving numbered lines 1 and 2 visible.
4. Press LN. This is that menu key 104 immediately below the menu label LN in the menu display. Now the display is as indicated in FIG. 3D. The function LN with a bracket or parentheses on its right is added in line 2 and the algebraic cursor 14 is shifted to the right.
5. The expression 2.3+1.0 is now added by actuating the correspondingly marked keys in sequence. The displays corresponding to these steps appear in FIGS. 3E, F and G. The menu labels remain unchanged.
6. Next press the shift key 107 and the shifted bracket key 116. This adds the bracket, FIG. 3H, to the end of the expression, which completes the quantity (2.3+1.0).
7. The key marked ENTER, key 105, is now actuated. This shifts the expression to the right side of the display, as seen in FIG. 3I, and enters the expression at the bottom of the display stack. The cursor 14 disappears.

Figure 4B:
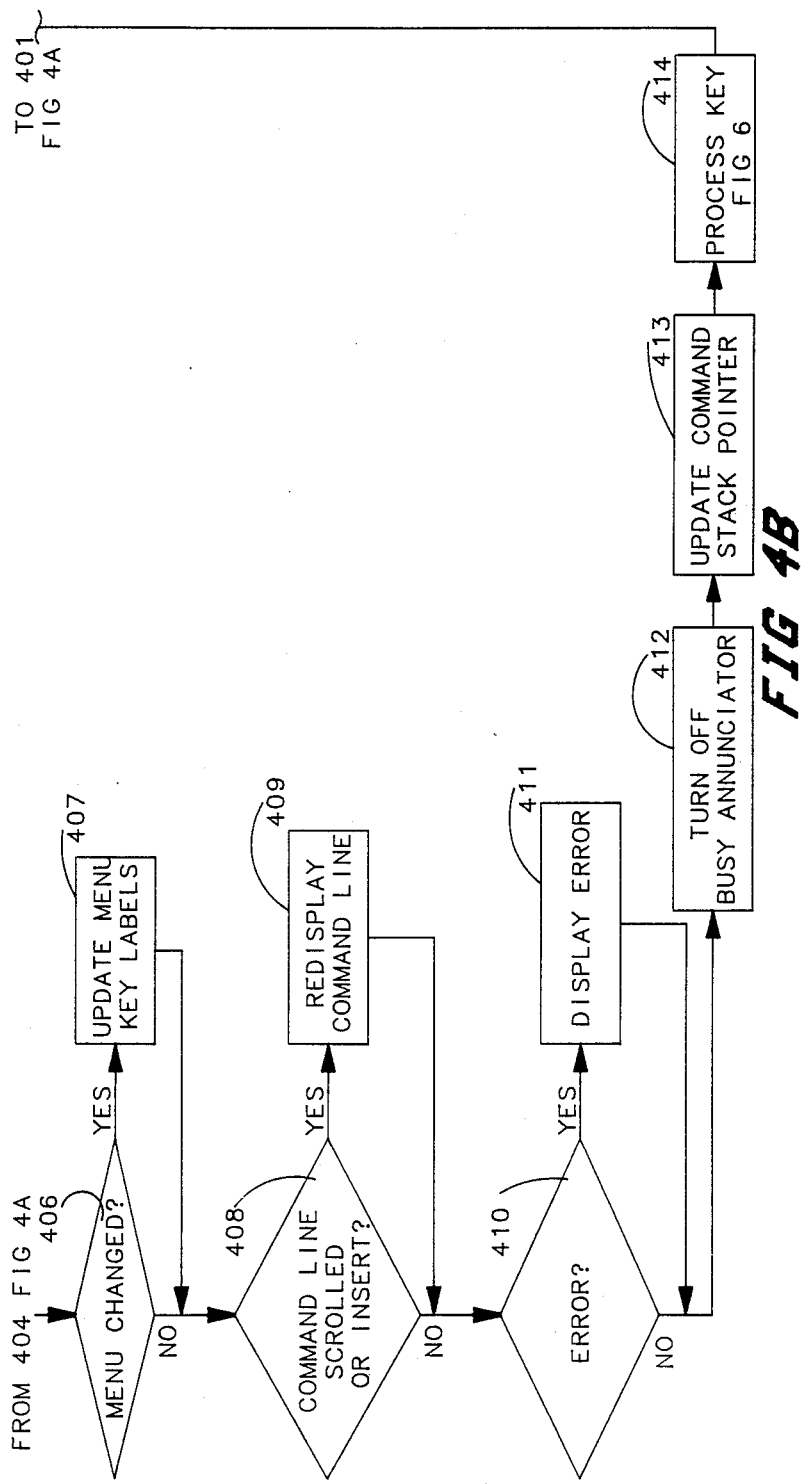

FIGS. 4A and 4B, 5A and 5B, 6, 7A, and 7B show flowcharts representing the logical implementation of the user interface of the present invention. The "outer loop" shown in FIGS. 4A and 4B is an endless loop constituting the outermost level of user interaction. Terms used in this flowchart are as follows:

1. The top outer loop function 401 is a logical start of the loop.
2. The low memory function 402 means a condition where available free memory 304 is so small that normal calculator operation becomes difficult. A low memory warning 401a is displayed.
3. The display stack function 403 (memory area 305) provides data stack objects from the data stack memory area 305 to user-readable characters which are entered on the right side of the display 103. The logic of this step is expanded in FIG. 5. The stack altered function 403a, initiates the display.
4. The enter function 404 refers to the operation of parsing and executing the contents of the command line 306, which can be initiated by pressing any immediate-execute key, particularly the key marked ENTER, key 105.
5. The trace function 405 refers to a user-controlled calculator mode. When trace mode is active, all user input and calculator results are automatically transmitted for printing via the infrared light-emitting diode 110.
6. The selection of a different menu for execution requires a new menu dislay for user viewing and interaction, if necessary. The menu changed decision function 406 initiates displaying the new menu label, function 407. When the command line is changed, a new line is displayed. Decision function 408 initiates the redisplay function 409.
7. The error decision function 410 refers to any calculator mathematical or logical error that interrupts the normal completion of a calculator operation. It initiates the display error function 411.
8. The busy annunciator function (412) relates to the display of that annunciator in line 106. This annunciator indicates that the calculator is busy, i.e., not ready to process new keystrokes. It is turned off automatically.
9. The command stack function 413 updates the command stack pointer which is a stack of four most recent command line entries which are, saved for subsequent reuse. These are entries in memory area 306.
10. The process key step (414) waits for and processes each key press. It is detailed in FIG. 6. The outer loop may wait indefinitely at this stage while awaiting new keyboard input.

Figure 5A:
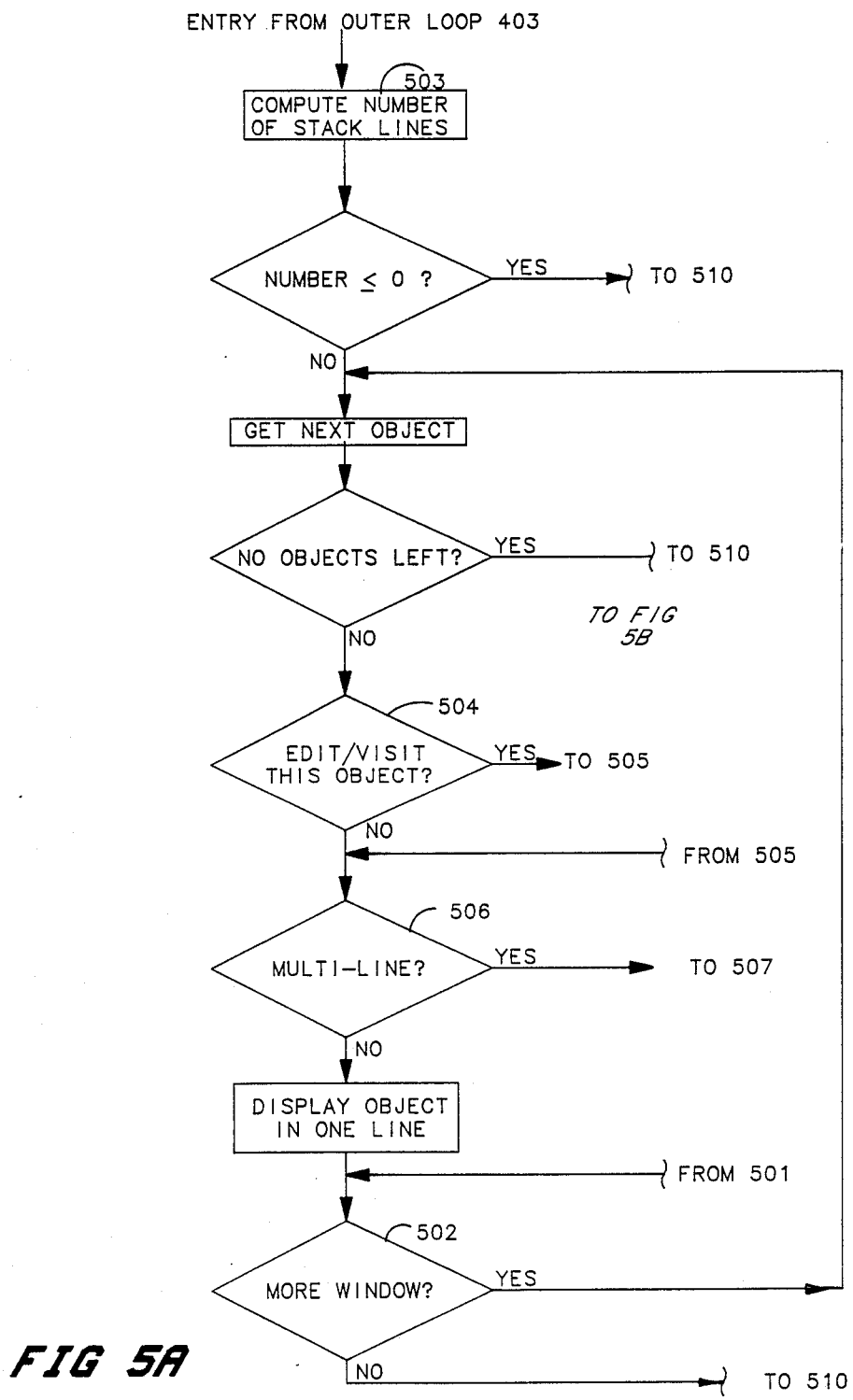
Figure 5B:
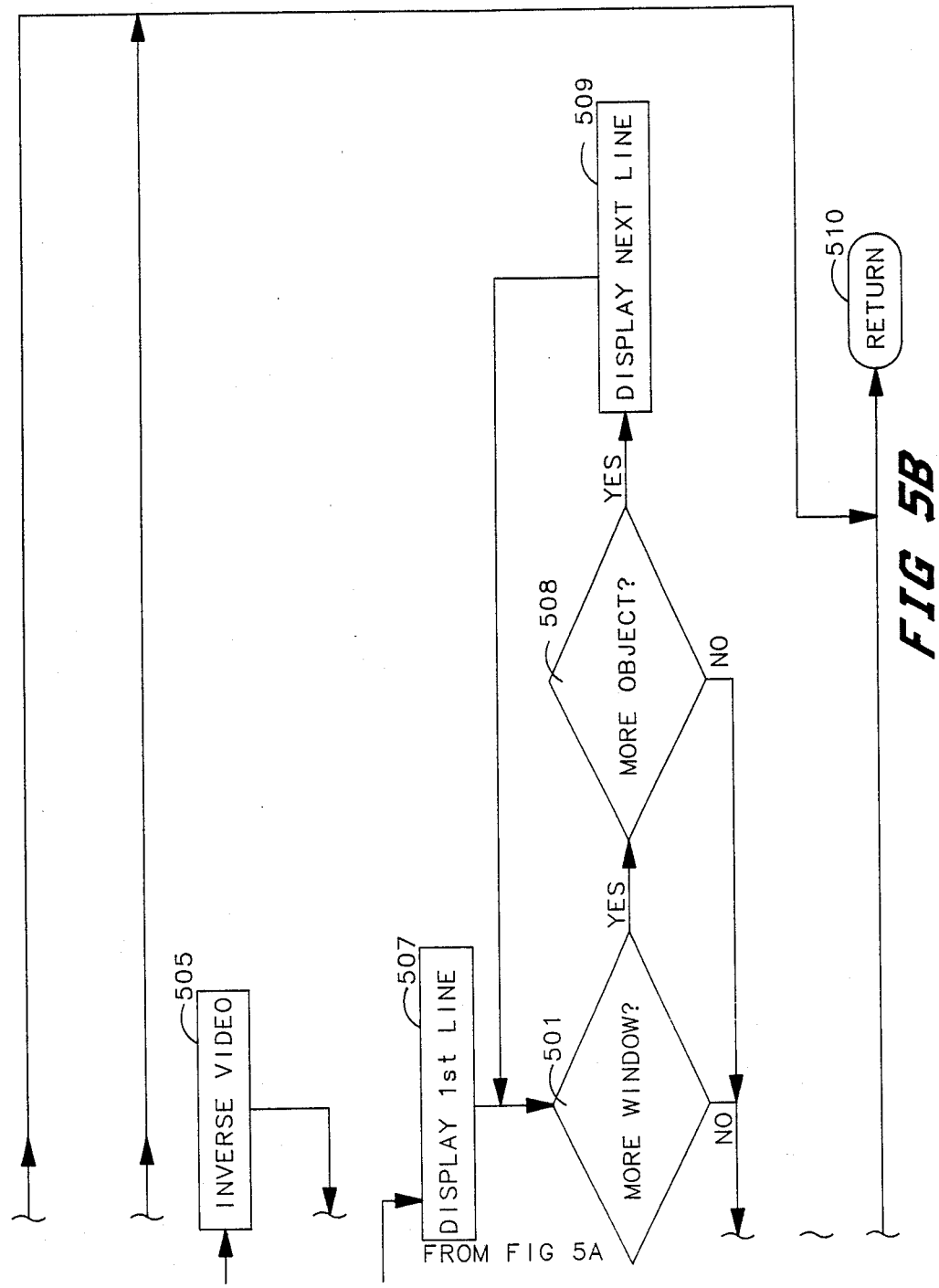

FIGS. 5A and 5B show the logic of the display stack operation 403. The display 103 can display four lines of character data. In order of decreasing priority, the normal display contains, starting with the bottommost display line:

1. Zero or one line containing menu key labels, shown in white-on-black characters.
2. Zero to four lines of the current command line entry.
3. Up to four lines of stack objects.

The "window" referred to in FIGS. 5A and 5B, functions 501, 502, indicates the portion (one to four lines) of the display available for stack object display, determined by the presence of the menu label line and/or the command line display. The number of stack lines 503 is the number of lines available in the window.

If the number of stack lines available is zero or less the display is bypassed.

If one or more lines are available, the next object, if one is available, is accessed for display.

The operations edit and visit, initiated by actuation of the EDIT and VISIT shifted keys 105 and 112 in FIG. 1B, referred to in the edit/visit decision function 504, cause an object to be copied from the stack to the command line so that its contents can be edited by the user. If the edited object is simultaneously visible in the command line and stack displays, the stack display of the object is shown in inverse video (white-on-black) by the inverse video function 505.

The multi-line function 506 tests a user-controlled multi-line display mode. If the multi-line mode is active, the first stack object is shown in one or more display lines, if required (functions 507, 501, 508, 509). Otherwise, it is shown in a one-line form. All other stack objects are shown on one line.

The return function 510 is to step 403 of FIG. 4 which returns the display to the stack.

Figure 6:
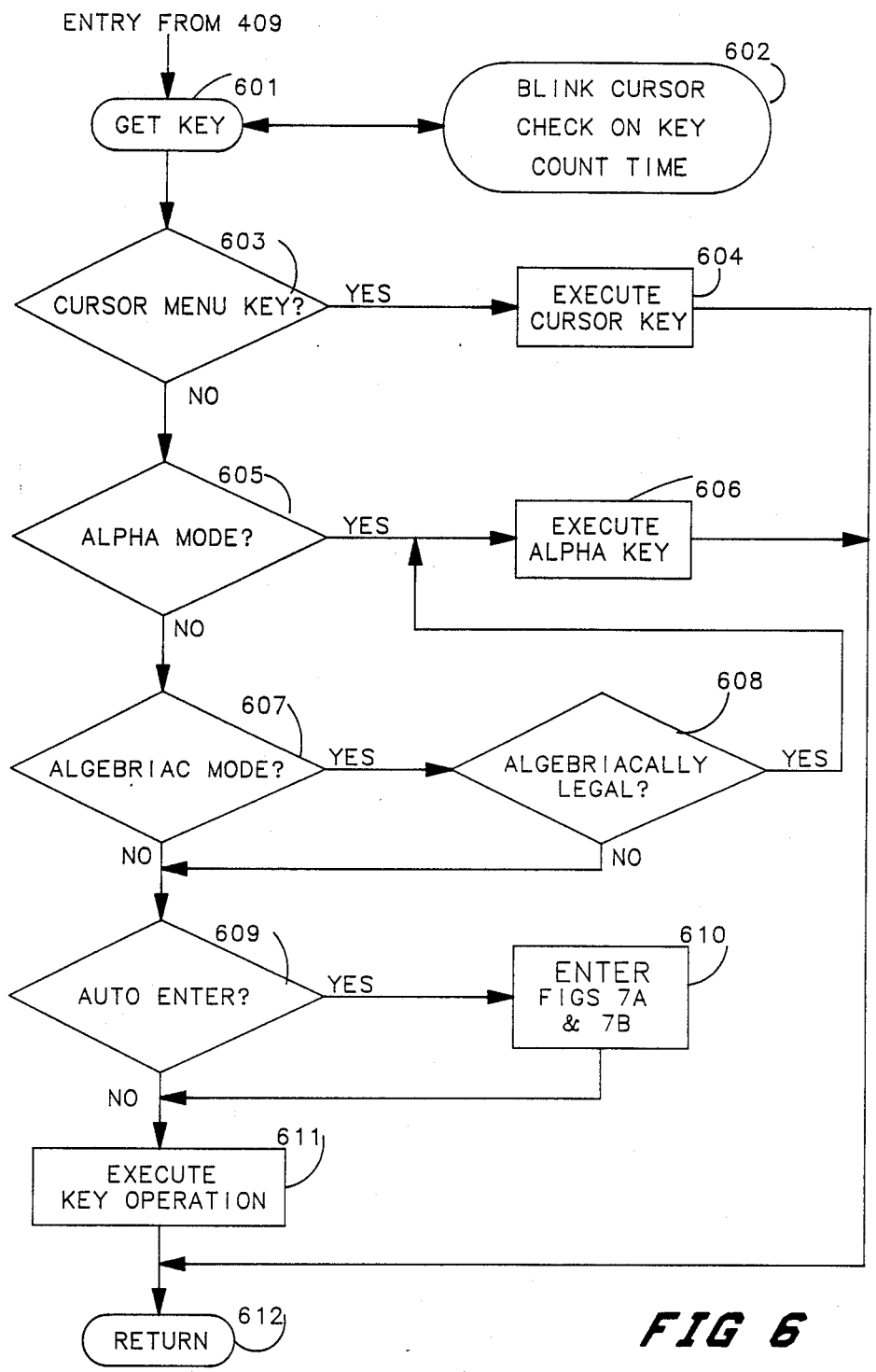

FIG. 6 shows the logical flow of the process key step 414. The get key step 601 is a wait state during which the process flow halts until an execute key press is detected by the electronics. This may be the algebraic mode in which objects may be entered in the command line. This state also can be interrupted by function 602 by electronic interrupts caused by system timers or the ON key 111. The interrupts allow the system to blink the command line cursor, if present, and to update the system clock.

If the multi-function key 104 which is acting, is a cursor movement key, a multi-function key press is detected by function 603, and the cursor movement is executed by function 604.

If the alpha mode is active, as determined at the alpha mode function 605, the alpha mode definition of the current key is executed by the execute alpha key function 606. For most keys, this means just adding the key name to the current command line in memory and on the display.

If the algebraic entry mode is active, decision function 607, and the current key is a character key or corresponds to a function that is legal in algebraic expression syntax, as determined at function 608, the alpha mode definition of the current key is executed by the execute alpha key function 606.

If neither alpha nor algebraic entry modes are active, the calculator is in the immediate (auto) entry and execute mode, at step 609. If the current key's definition includes an automatic enter execution of the enter sequence 610 (see FIGS. 7A and 7B) is executed. Finally, the key's immediate entry definition is executed at function 611.

The return 612 is to the outer loop.

Figure 7B:
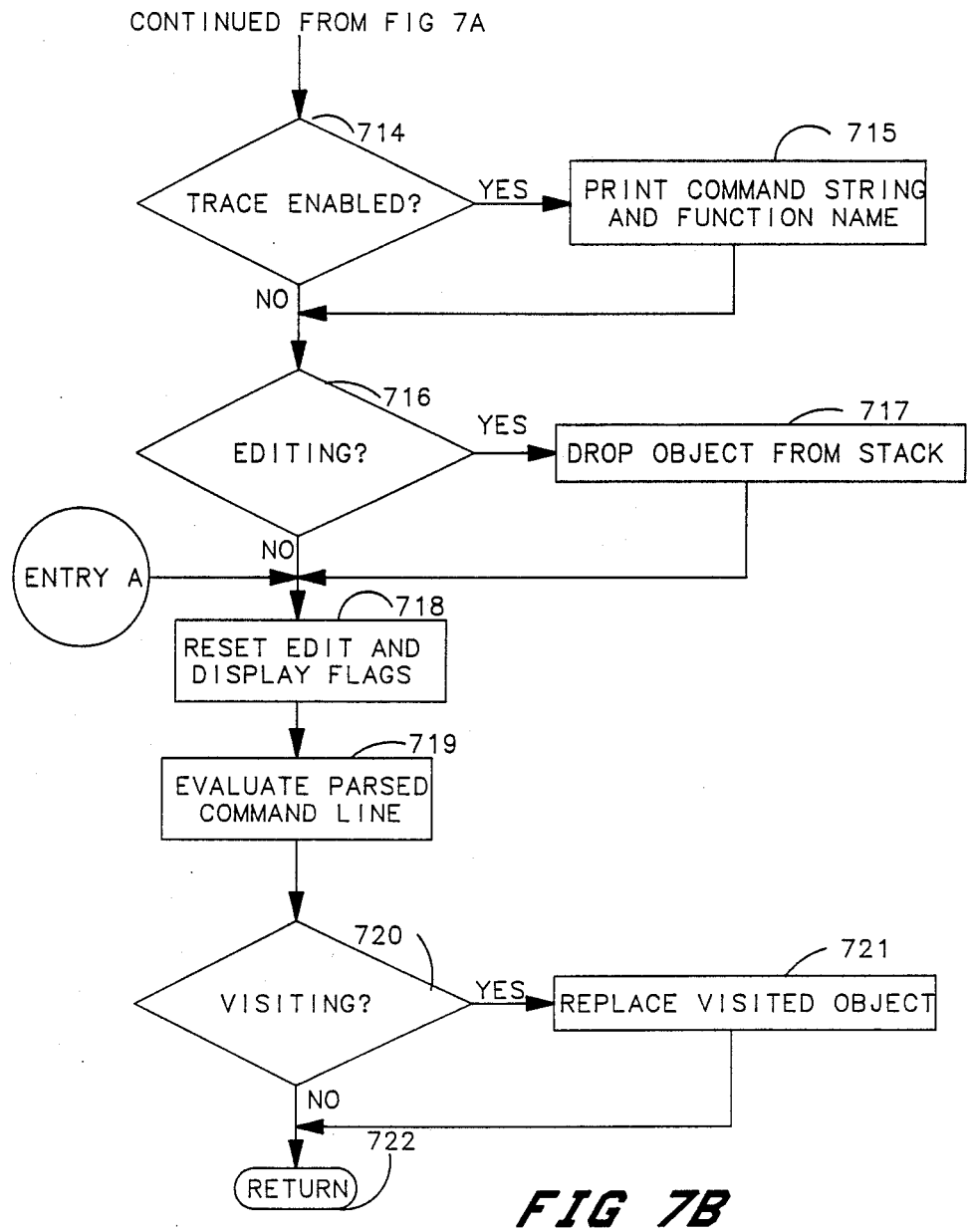

FIGS. 7A and 7B illustrate a flowchart of the logical implementation of the enter operation step 610. At the start of the enter process, the busy annunciator 701 in the annunciator line 106, not shown in FIG. 1B but referenced in the definitions, is turned on. This is cleared only by the turn of busy annunciator function 412, FIG. 4B, after all resulting processing is complete and the calculator is ready for additional user input.

The undo enabled decision function 702 signifies that the calculator will save a copy of the data stack prior to further processing, for the purpose of error recovery. If the decision is yes the function 703 which saves a copy of the stack is initiated.

Step 704 resets the top-of-stack display counter, in case it has been altered by a stack view function.

In step 705, the name of the function corresponding to the current key press is obtained for the purpose of printing during the trace mode. If the command line is empty, the decision function 706 initiates the trace enabled decision function 707. If the trace mode is enabled, the function name is printed. The print function name step 708 causes the function name to be transmitted via the infrared light-emitting diode 110 of FIG. 1.

If the command line is not empty, then the entire command line is parsed, i.e., checked for correct syntax, at the parse command line function 709. If a syntax error is detected at the parse error decision function 710, the command line is restored by function 711, with the cursor at the location of the error within the line, and a syntax error message is displayed by this function 711, and control returns to the top of the outer loop 401.

If the command stack is determined to be enabled by the decision function 712, the command line text is saved by function 713 in the 4-level command stack, for possible re-use.

At decision function 714, FIG. 7B, if the trace mode is enabled, function 715 causes the contents of the command line, and the current key function name to be transmitted by the infrared light-emitting diode 110 for printing.

If the current enter mode is terminating an edit of the top stack object, decision function 716 initiates function 717 to drop that object from the stack. Next, the function 718, responding to its inputs, resets the edit and display flags and enables the function 719.

At the evaluate parsed command line function 719, the program represented by the command line entry plus the current key definition is executed. This is the primary user-visible step, representing the execution of the instructions given to the calculator by means of the command line and the terminating key press.

When the command line execution is complete, if the current ENTER terminated the editing function 716 or visiting function 720 of a stack object or a variable, the new topmost stack object is used to replace the original object, function 721.

The return 722 is to the process or execute key operation 611 as seen in FIG. 6.

INDUSTRIAL APPLICABILITY

This invention is applicable generally in data processing operations involving the manipulation of expressions defining physical, economic, or other relationships.

We claim:
1. An electronic calculator, comprising:
   a. memory means including a data stack;
   b. a display;
   c. objects in said memory means, each object having an object type identifier, each object having a logical syntax;
   d. individual programs of object execution concordant with the syntax of individual objects, in said memory means, each program having an identifier of its program of object execution;
   e. a user interface for accessing said memory means;
   f. first means forming part of said user interface for selecting and displaying a plurality of user readable identifiers of programs of object execution from said memory means, which programs of object execution are concordant with the syntax of a user selected class of object types;
   g. second means forming part of said user interface for selecting and displaying a user readable identifier of a single program of object execution from said plurality of programs of object execution, which single program of object execution is concordant with a selected object;
   h. third means forming part of said user interface for accessing said memory means for selecting and displaying said selected object type in user readable form; and
   i. fourth means forming part of said user interface for entering said selected object for processing on said data stack and shifting each selected object on said display to indicate to a userr that each selected object has been entered on the data stack.
2. A calculator according to claim 1, comprising:
   a. means forming part of the user interface for entering an output object which is the result of executing each selected object on said data memory stack.
3. The calculator according to claim 1, wherein:
   a. said identifier of a single program of object execution is displayed as part of said selected object as a symbol in user readable form.
4. The calculator according to claim 3, in which:
   a. said object type identifier is displayed with said identifier of a single program of object execution as a prefix symbol for each selected object.
5. The calculator according to claim 1, in which:
   a. said object type identifier is the same on all objects of the same type.
6. The calculator according to claim 1, in which:
   a. said object type identifier further comprises a postfix symbol selected at said user interface.
7. An electronic calculator, comprising:
   a. a user interface including a display and a memory area having a memory stack for receiving objects on a last in first out basis and for displaying said objects in user readable form;
   b. first means forming part of said user interface for entering objects of different types in said memory stack, each object type characterized by specific logical syntax;

c. second means forming part of said user interface for applying characteristic object type identifiers to said objects upon object entry to said memory stack and displaying said object type identifiers as symbols in user readable form; and
d. third means responsive to said object type identifiers for applying operations to said objects affecting their internal composition concordant with their logical syntax.

* * * * *

UNITED STATES PATENT AND TRADEMARK OFFICE
CERTIFICATE OF CORRECTION

PATENT NO. : 4,885,714

DATED : December 5, 1989

INVENTOR(S) : G.L. Eisenstein et al.

It is certified that error appears in the above-identified patent and that said Letters Patent is hereby corrected as shown below:

Column 12, line 40; "userr" should be --user--.

Signed and Sealed this

Twenty-eighth Day of July, 1992

Attest:

DOUGLAS B. COMER

Attesting Officer     Acting Commissioner of Patents and Trademarks